United States Patent [19]
Gruett et al.

[11] Patent Number: 6,164,924
[45] Date of Patent: Dec. 26, 2000

[54] PISTON AND DRIVE ASSEMBLY FOR USE IN A PUMP

[75] Inventors: Donald G. Gruett, Manitowoc; Michael Wech, Two Rivers, both of Wis.

[73] Assignee: Oil-Rite Corporation, Manitowoc, Wis.

[21] Appl. No.: 09/144,909

[22] Filed: Sep. 1, 1998

[51] Int. Cl.[7] .................................................. F04B 1/26
[52] U.S. Cl. ........................ 417/222.1; 222/231; 73/3; 417/415
[58] Field of Search ...................... 417/18, 555.1, 417/415, 553, 478, 222, 222.1, 225, 399, 439, 521; 92/68, 137, 140; 137/555.6, 3, 99; 60/445; 222/14, 321; 73/290 R, 3; 74/25; 184/7.4

[56] References Cited

U.S. PATENT DOCUMENTS

| | | | |
|---|---|---|---|
| 3,631,889 | 1/1972 | Weinstein | 137/556.6 |
| 3,726,093 | 4/1973 | Malott | 60/445 |
| 3,922,957 | 12/1975 | Ogle et al. | 92/137 |
| 4,060,178 | 11/1977 | Miller | 222/14 |
| 4,273,517 | 6/1981 | Heyl | 417/222 |
| 4,449,543 | 5/1984 | Greene, Jr. | 137/3 |
| 4,753,118 | 6/1988 | Siller | 74/25 |
| 4,762,000 | 8/1988 | Bond, Jr. | 73/290 R |
| 4,784,578 | 11/1988 | Gruett | 417/225 |
| 4,784,584 | 11/1988 | Gruett | 417/399 |
| 4,915,591 | 4/1990 | Funke | 417/18 |
| 4,999,020 | 3/1991 | Stocco et al. | 417/222 |
| 5,017,105 | 5/1991 | Rottel | 417/439 |
| 5,151,015 | 9/1992 | Bauer et al. | 417/415 |
| 5,234,134 | 8/1993 | Raab et al. | 222/321 |
| 5,299,446 | 4/1994 | Pardinas et al. | 73/3 |
| 5,405,252 | 4/1995 | Nikkanen | 417/478 |
| 5,486,097 | 1/1996 | Schaffner | 417/222.1 |
| 5,505,224 | 4/1996 | Urrutia et al. | 137/99 |
| 5,638,920 | 6/1997 | Gruett | 184/7.4 |
| 5,938,416 | 8/1999 | Saito et al. | 417/521 |
| 5,975,858 | 11/1999 | Shimotomal | 417/222.1 |
| 5,984,652 | 11/1999 | Gruett et al. | 417/553 |

*Primary Examiner*—Teresa Walberg
*Assistant Examiner*—Leonid Fastovsky
*Attorney, Agent, or Firm*—Nicholas A. Kees; Godfrey & Kahn, S.C.

[57] ABSTRACT

A single-piece piston and drive assembly for use in a motor-actuated pump to meter a predetermined amount of lubricant or other liquid. The drive assembly includes a rotatable drive shaft, an eccentric cam insert, a cam rod, and a rocking beam. The rocking beam is coupled to the piston, the cam rod shaft, and a biasing mechanism. When the drive shaft is rotated, movement of the cam rod shaft causes the rocking beam to pivot and move the piston along a stroke to dispense the liquid. The piston operates in association with a flow adjustment stem that regulates the amount of liquid metered by the pump, and a valve assembly for evacuating the liquid from the pump chamber into and through an outlet fitting.

Also provided is a flow volume indicator for use in a pump for indicating the amount of liquid being discharged. The flow volume indicator has a main body with an annular side wall, flexible base wall, and a knobbed pointer that is inserted into a bore of the pump body and coupled to the flow adjustment stem. Movement of the flow adjustment stem causes the knobbed end of the pointer to move and the base wall to flex.

29 Claims, 8 Drawing Sheets

FIG_2

FIG_3

FIG_4

FIG_5

FIG_6

FIG_7

FIG_8

FIG_9

FIG_10

FIG_11

FIG_12

PISTON AND DRIVE ASSEMBLY FOR USE IN A PUMP

FIELD OF THE INVENTION

The present invention relates to devices that are used to precisely meter a liquid. More particularly, the invention relates to a piston and drive assembly that can be used in a lubricator or other pump to meter a precise volume of liquid, such as a lubricant, and that can be used in a variety of applications.

BACKGROUND OF THE INVENTION

Motor-driven pumps are known and used for metering liquids to tool or other object. Typically, such pumps have a reciprocating piston actuated by a drive assembly that is connected to a motor. Various drive assemblies and connecting linkages to the piston have been described.

For example, U.S. Pat. No. 1,895,623 (Hewitt) describes a pump having a plunger that is reciprocated by an oscillatory lever connected to a cam mechanism. The lever is oscillated by the opposing forces of a downwardly biasing spring upon one end of the lever, and the rotation of an eccentric cam against the other end of the lever. Each revolution of the eccentric cam causes an upward stroke to the plunger. The plunger is then forced downwardly by means of the biasing spring.

Another reciprocating piston pump, found in U.S. Pat. No. 2,390,798 (LeClair), includes a lever connected at one end to a piston and at the other end to a plunger, is rocked back and forth by the rotation of an operating cam against a roller positioned about midway along the rocking lever. The piston is forced upwards by a coil spring, and downwards by the contact of the cam against the roller which forces the rocking lever downwards about its pivotal connection.

In yet another pump, described in U.S. Pat. No. 2,407,343 (Pyne et al.), a drive shaft carrying eccentric cams drive a series of pump pistons that pass liquid through a conduit to a plunger. A linkage connects the plunger to the pump pistons. As the liquid pressure increases, the plunger moves rearwards causing a rocking link to move a yoke forward that forces the pistons out of contact with the eccentric cams.

A drawback of each of these pumps is the use of a complex series of linkages to connect the piston with a drive assembly. Another drawback is that such pumps do not deliver a precise amount of liquid to a desired location or device. Yet another disadvantage of known pumps is that there is no indicator for showing output volume flow from the pump.

Accordingly, it would be desirable to have a motor-driven pump that has a simple design, and is capable of delivering a precise amount of lubricant or other liquid to a desired point. It would also be desirable to have a mechanism that can be set for indicating the amount of liquid being discharged from the pump.

SUMMARY OF THE INVENTION

Therefore, it is an object of the present invention to provide a piston and drive assembly for use in a pump that has a relatively simple design for metering an amount of lubricant or other liquid to a tool or other item. Another object is to provide a metering device having a piston and drive assembly that can deliver a more precise amount of liquid than prior art devices. Yet another object is to provide a mechanism that can be mounted in a pump to display the amount of liquid that is being dispensed for ready observation by the user. A further object is to provide a pump that is designed to supply a specific amount of liquid/stroke that is calibrated to a flow indicator.

These and other objects and advantages are achieved in the present piston and drive assembly for use in a pump such as a lubricator, and methods of using the pump to deliver a liquid to an object or other desired location. Also provided is a flow volume indicator for use in a pump for indicating the amount of liquid being discharged.

The liquid is discharged in a predetermined amount by the action of the piston. The stroke of the piston determines the amount of liquid metered. The piston operates in conjunction with a drive assembly that moves the piston along a stroke, and a valve assembly for assisting the evacuation of liquid from a pump chamber into a central bore in an outlet fitting. The piston and most other components are disposed in chambers within the body, and the body includes an opening for receiving a reservoir or tubing for conducting liquid into the appropriate chamber in the apparatus.

The piston and drive assembly can be installed in a pump that is rotatably actuated, for example, by a motor. The piston is composed of a first end section, a second end section, and a conduit for conducting a liquid from a position on the piston to the first end section. The drive assembly includes a rotatable drive shaft, an eccentric cam insert positioned on the drive shaft, a cam rod positioned on the eccentric cam insert and having a shaft with a slotted first end, and a rocking beam having an output end, an actuator end, and a pivot point. The rocking beam is coupled to a biasing mechanism such as a spring, and includes a pin that is inserted through the slot in the cam rod shaft. The output end of the rocking beam is coupled to the second end section of the piston. In one embodiment, the output end of the rocking beam has two prong extensions that straddle opposite sides of the second end section of the piston which can include opposing grooves, for example, in an hourglass configuration, for receiving the prong extensions therein.

The movement of the rocking beam between a first beam position and a second beam position moves the piston correspondingly along a stroke. The biasing spring coupled to the rocking beam biases the rocking beam toward the first beam position. When the drive shaft is rotated, the cam rod shaft is moved upward and downward through an opening in the rocking beam between a first shaft position and a second shaft position. As the cam rod shaft moves downward toward the second shaft position, the end of the slot in the cam rod shaft contacts the pin of the rocking beam causing the rocking beam to pivot downward to the second beam position and the piston to move correspondingly to discharge liquid from the pump. As the drive shaft rotates, the cam rod shaft moves upward to the first shaft position and the biasing action of the spring pivots the rocking beam back to the first beam position.

The pump can include a flow adjustment stem for regulating the stroke of the piston and the amount of liquid dispensed from the pump. The flow adjustment stem includes a first end section that extends out of the body of the pump and a second end section positioned near the second end of the piston. The position of the flow adjustment stem can be adjusted in the pump to modify the stroke of the piston and the amount of liquid metered by the pump.

The evacuation valve assembly of the pump is disposed within a liquid evacuation chamber. One end of the evacuation valve assembly is coupled to an outlet fitting. The other end of the evacuation valve assembly includes a valve that is removably seated against the outlet of the pump chamber.

Also provided is a flow volume indicator for indicating the amount of liquid that is dispensed from the pump. The flow volume indicator is composed of a main body with a pointer having a tip end, and a knob end that is coupled with the flow adjustment stem positioned in the body of the pump. The flow volume indicator has an annular side wall, a flexible base wall with a first surface and a second surface, and an opening opposite the base wall and defined by the annular wall. The knob end of the pointer protrudes from the first surface of the base wall, and the tip end protrudes from the second surface of the base wall. Preferably, the flow volume indicator is cast as one piece. The flow volume indicator is sized for being inserted into a bore in the body of the pump, knob end first. When the flow adjustment stem is moved within the body of the pump to adjust the stroke of the piston, the knob end of the pointer moves with the flow adjustment stem from a first position to a second position, while the annular side wall of the flow volume indicator is held stationary within the bore, and the base wall of the flow volume indicator flexes. In one embodiment, the annular side wall of the flow volume indicator is flared in cross-sectional view. In another embodiment, the annular side wall of the flow volume indicator has a lip extension that extends continuously around the annular side wall.

The body of the pump includes an opening for receiving a reservoir for the liquid to be dispensed or tubing connected to a source of liquid. The body of the pump can be cast to accommodate the attachment of a removable reservoir as an integral part of the pump to provide a substantially complete and compact unit.

Advantageously, the present invention provides a motor-driven pump that has a drive assembly of a simple design. Another advantage is that the pump allows precise metering of very small volumes of liquid. In addition, the design of the pump is relatively simple with fewer interconnecting moving components compared to other pumps. The pump is structured to be easily assembled and disassembled for periodic maintenance and cleaning. The present pump also provides the use of a direct operating injector without the need for pilot valves or other associated components.

Further objects and advantages of the present invention will become more apparent from the following detailed description taken in combination with the accompanying drawings.

BRIEF DESCRIPTION OF THE DRAWINGS

Throughout the following views, reference numerals will be used on the drawings, and the same reference numerals will be used throughout the several views and in the description to indicate same or like parts of the invention.

DETAILED DESCRIPTION OF THE INVENTION

Referring now to the drawings, an embodiment of a pump 10, incorporating a piston and the drive assembly of the invention is shown in FIGS. 1–5. It is understood that the piston and drive assembly can be incorporated into a variety of pumps and, more generally, pumps that are rotary-actuated (e.g., motor-driven) to deliver a liquid to a desired location in a controlled manner. The pump can be one that dispenses a liquid in a continuous flow, or an injector pump that dispenses a liquid intermittently in an interrupted flow. For purposes of explanation, the operation of the piston and drive assembly in a specific motor-driven pump is described herein.

Figure 1:
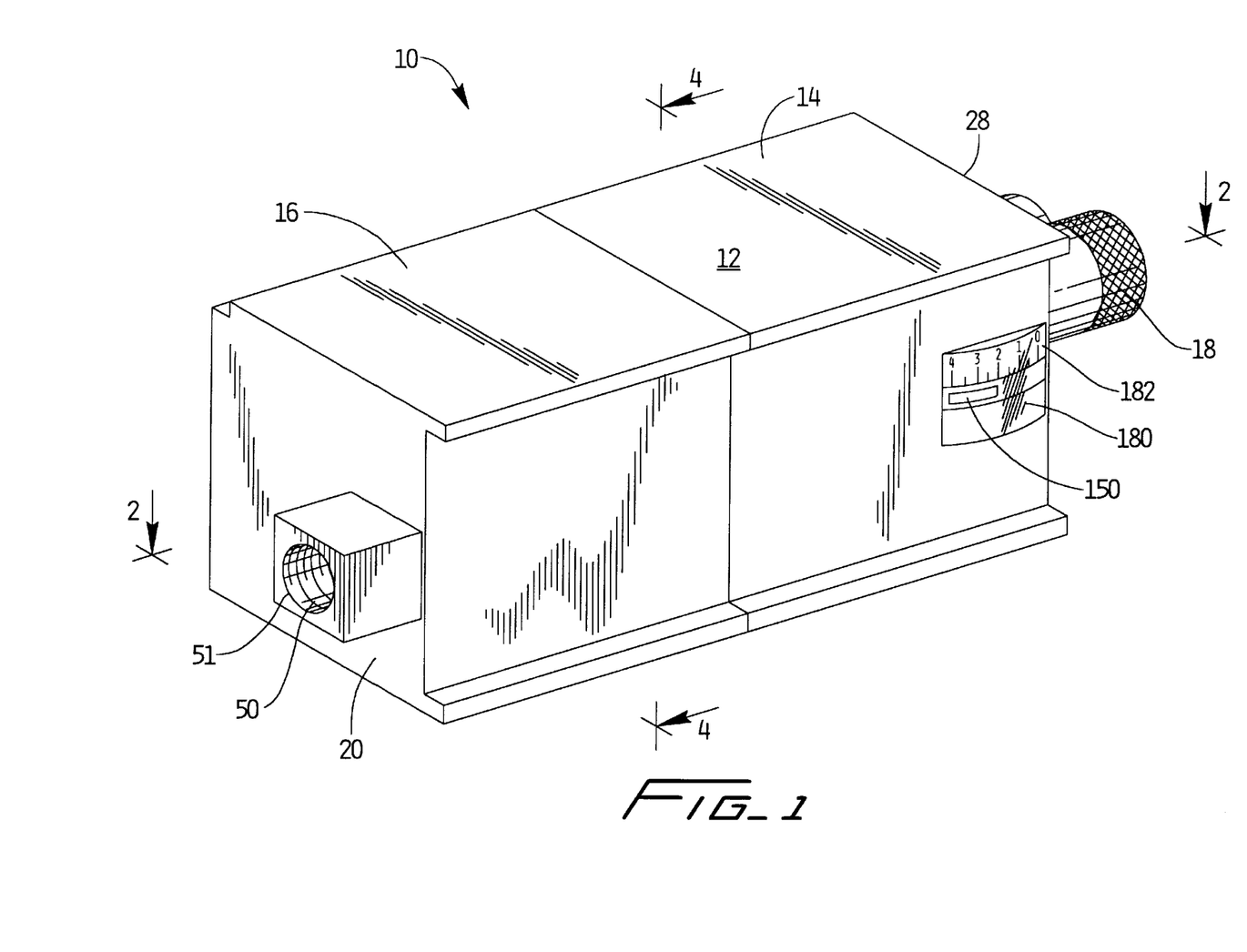
FIG. 1 is a perspective view of a pump constructed according to the present invention.

In general, as depicted in FIG. 1, the pump 10 includes a body 12 having two halves 14, 16, and a flow adjustment stem 18. The flow adjustment stem 18 is mounted on one end of the pump body 12, and regulates the amount of liquid metered from the pump. An outlet fitting (not shown) can be mounted on the other end 20 of the pump body 12. The pump body 12 includes a liquid inlet bore 28 for receiving a reservoir or tubing (not shown) therein and conducting liquid from the reservoir or an outside source into the appropriate chamber in the apparatus.

Figure 2:
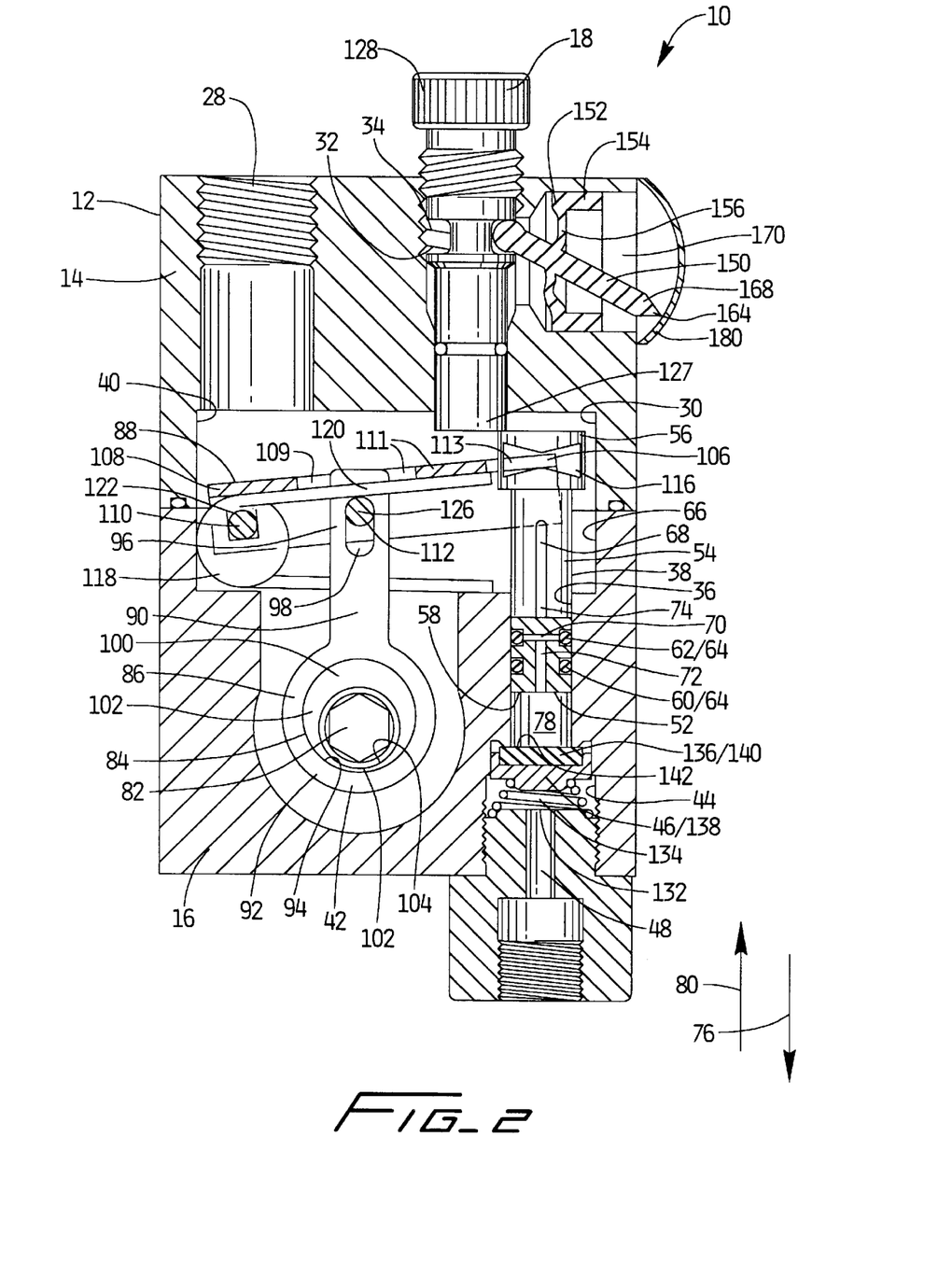
FIG. 2 is a cross-sectional view of the pump of FIG. 1 taken along line 2—2, and showing the piston in a first position in the pump.
Figure 3:
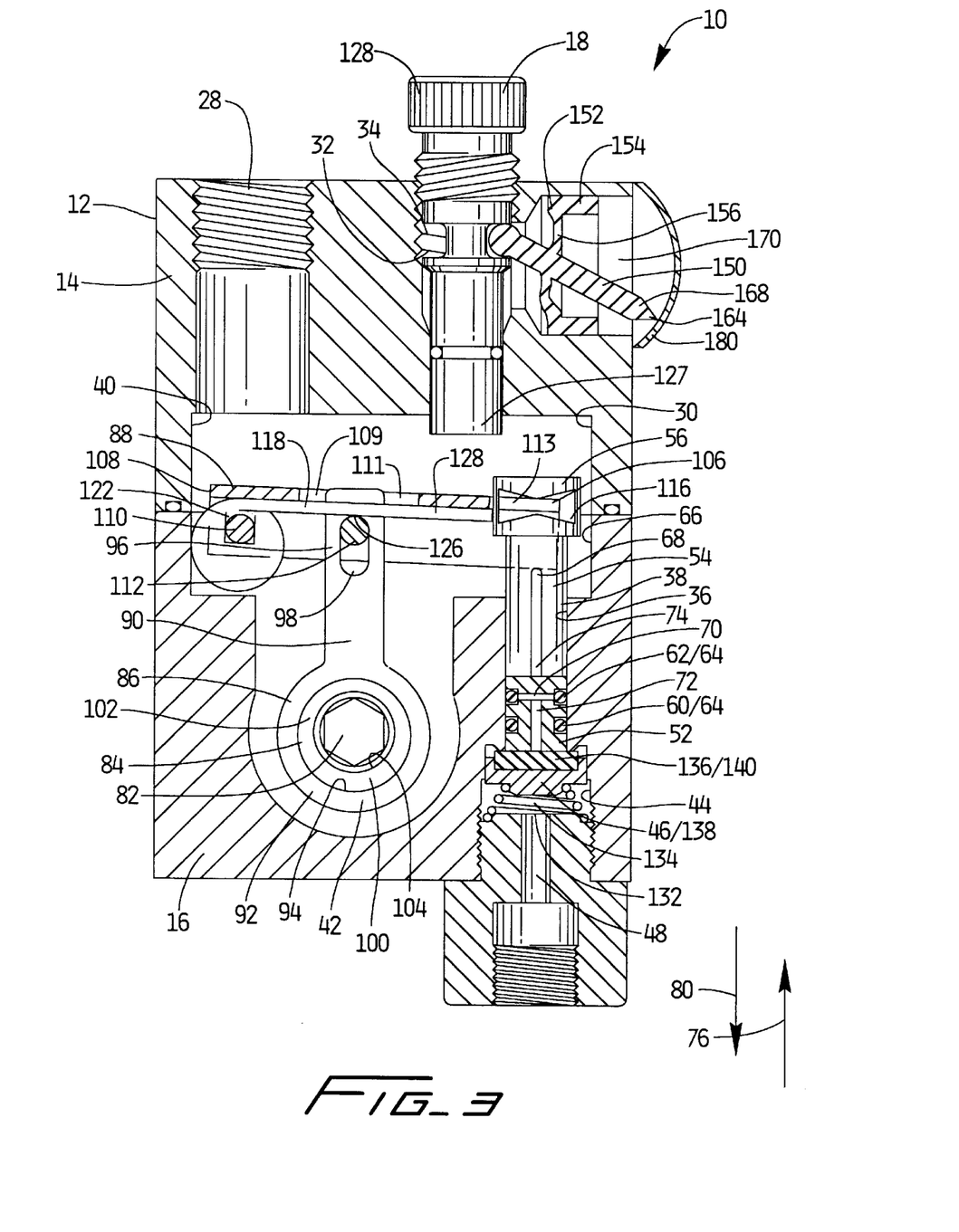
FIG. 3 is a cross-sectional view of the pump of FIG. 1 as in FIG. 2, showing the piston in a second position in the pump.

A central bore 30 extends the entire length of the pump body 12 and defines a plurality of chambers. As shown in FIGS. 2 and 3, the pump body 12 includes a chamber 32 that has an opening 34 with a threaded sidewall that is adapted to receive the flow adjustment stem 18. Adjacent to the chamber 32 is a piston chamber 36 that is adapted to receive the piston 38, and a drive chamber 40 that is adapted to receive the drive assembly 42. The piston chamber 36 leads into a liquid evacuation chamber 44 that is adapted to receive the evacuation valve assembly 46, and leads into the liquid outlet bore 48. One end 50 of the liquid evacuation chamber 44 has a threaded bore 51 for receiving an outlet fitting (not shown).

The piston 38 can be a single-piece construction as described, for example, in co-pending U.S. patent application No. 5,984,652 (issued Nov. 16, 1999) and Pat. No. 6,071,097, (issued Jun. 6, 2000) the disclosures of which are incorporated by reference herein. The piston 38 operates in conjunction with the flow adjustment stem 18, the drive assembly 42, and the evacuation valve assembly 46 to meter a precise amount of liquid from the pump 10. The piston 38 can be made from a single piece of hard and durable material such as steel, stainless steel, plated steel, brass, and the like.

As depicted in FIGS. 2 and 3, the single-piece piston 38 has a grooved first end section 52, a stem section 54, and a disc-shaped second end section 56. The first end section 52 has a flat head 58 and first and second channels 60, 62, that are circumferentially disposed about the piston 38. A sealing member 64, such as an O-ring, is stationarily seated in channel 60 and movably seated in channel 62. The second channel 62 is roughly U-shaped and angled, with one side being deeper than the other. A part of the stem section 54 of the piston 38 is positioned in a liquid chamber 66. The stem section 54 of the piston 38 has a conduit or slot 68 that extends longitudinally along the exterior of the stem 54 and forms a conduit for the flow of liquid from the liquid chamber 66 into the second, angled channel 62. The liquid chamber 66 is in liquid communication through a passageway (not shown) with the liquid inlet bore 28 that is connected through tubing to an outside liquid source, or to a removable reservoir mounted therein (not shown).

In one embodiment of the piston as described in co-pending U.S. patent application Pat. No. 5,984,652, an aperture positioned in the base of the second channel 60 leads to a transverse oriented passageway 70, and to a longitudinal central bore 72 that extends from through the center of the first end section 52 to the flat head 58 of the piston 38 (FIGS. 2 and 3). In another embodiment of the piston (not shown), the passageway and central bore of the grooved end section are replaced by a slot that extends from the head 58 of the piston to the second channel 62, as further described in co-pending U.S. patent application Pat. No. 6,071,097.

When the piston 38 is disposed within the pump body 12 of a pump 10, movement of the slidable piston 38 within the piston chamber 36 causes the sealing member 64 in the second, angled channel 62 to move from one side of the channel to the other to block and unblock the end 74 of the conduit 68 and the aperture in the bottom of the second, angled channel 62. During the return stroke (e.g., backstroke) in the direction of arrow 76, and when the piston 38 is at the top of a cycle, as shown in FIG. 2, the sealing member 64 moves so that the end 74 of the conduit 68 and the aperture are uncovered. This allows liquid from the liquid chamber 66 surrounding the stem section 54 of the piston 38 to flow into the conduit 68, into the second, angled channel 62, and through the passageway and the central bore 72 to a metering or pump chamber 78 adjacent to the head 58 of the piston 38. On the "down stroke" (e.g., forward stroke) in the direction of arrow 80 and when the piston 38 is at the end or bottom of a cycle, as seen in FIG. 3, the sealing member 64 moves to block the end 74 of the conduit 68 and the aperture in the second channel 62, such that liquid is prevented from flowing from the conduit 68 into the channel 62 and through the aperture into the central bore 72.

Figure 4:
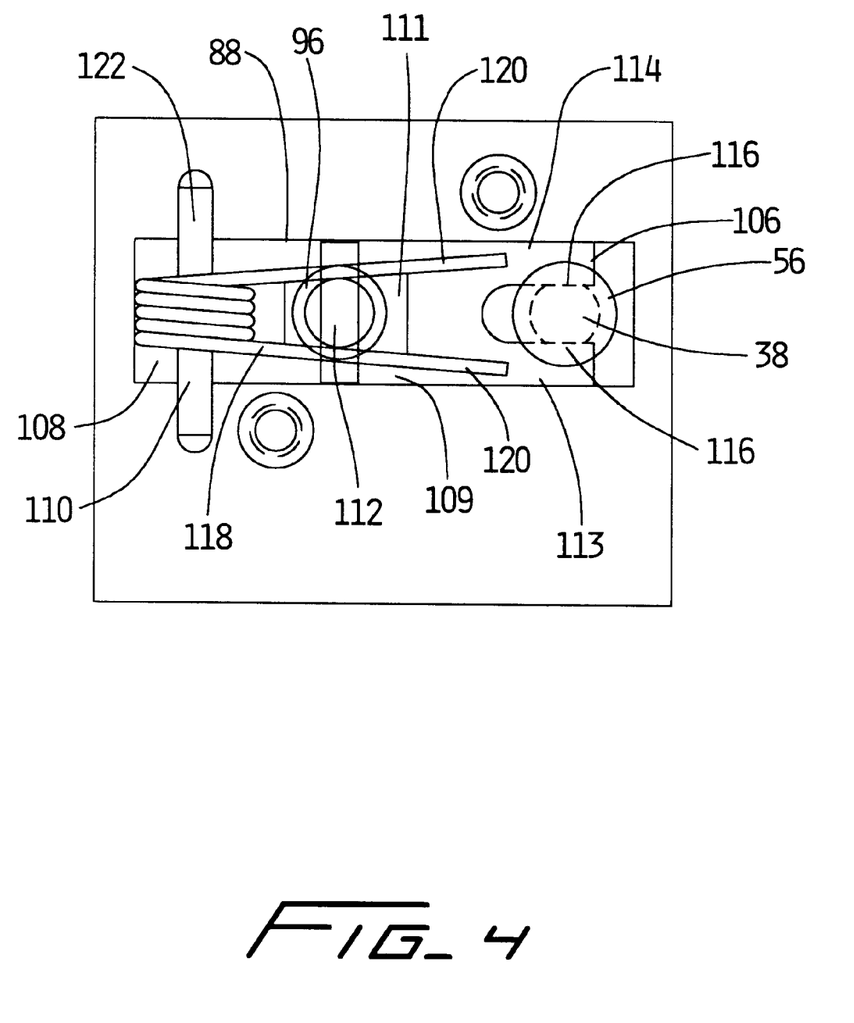
FIG. 4 is a view of the pump of FIG. 1 taken along line 4—4, with the first half of the pump body removed, showing the rocking beam seated in the second half of the pump body.

The piston 38 is moved along a stroke within the piston chamber 36 by the action of the drive assembly 42, as depicted in FIGS. 2–4. The drive assembly 42 includes a rotatable drive shaft 82, an eccentric cam insert 84, a cam rod 86, and a rocking beam 88 that is coupled to the piston 38. The cam rod 86 has a shaft 90 and a cylindrical section 92 that has a bore 94 which is sized for receiving the cam insert 84 therein. The first end 96 of the shaft 90 includes an elongated slot 98. The cam insert 84 is eccentric with a wide portion 100 and a narrow portion 102, and a bore 104 sized for receiving the drive shaft 82 therethrough. As shown, the drive shaft 82 and the bore 104 of the cam insert 84 are hexagonal in shape.

The cam insert 84 is positioned on the drive shaft 82, and the cam rod 86 is positioned on the cam insert 84. The fit of the drive shaft 82 within the bore 94 of the cam insert 84 is such that, as the drive shaft 82 is rotated, the cam insert 84 and drive shaft 82 will turn in unison. The fit of the cam insert 84 within the bore 94 of the cam rod 86 is such that, as the drive shaft 82 and cam insert 84 rotate, the cam insert 84 turns freely within the bore 94 of the cam rod 86, causing the cam rod shaft 90 to move from a first position in the direction of arrow 76 (FIG. 2) to a second position in the direction of arrow 80 (FIG. 3).

The rocking beam 88 has an output end 106, an actuator end 108, a mid-portion 109, and a pivot point 110. The mid-portion 109 includes a slotted portion 111 and a pin 112. The output end 106 of the rocking beam 88 is coupled to the second end 56 of the piston 38.

One method of coupling the rocking beam to the piston is to provide the first end 106 with forked prongs. As best seen in FIG. 4, the output end 106 of the rocking beam 88 can have two prong extensions 113, 114 that straddle the section end section 56 of the piston 38. The second end section 56 of the piston 38 can include opposing longitudinal grooves or slots 116 to receive the prongs 113, 114 of the rocking beam 88 therein. As best shown in FIGS. 2 and 3, the slots 116 can be an hour-glass or bowtie configuration. As the rocking beam 88 pivots up and down, the angle of the rocking beam 88 to the piston 38 changes. The configuration of the slots 116 and the fit of the prongs 113, 114 in the slots 116, allow the prongs 113, 114 to slide back and forth, and shift within the slots 116 from a first position (FIG. 2) to a second position (FIG. 3), to move the piston 38 along a stroke within the piston chamber 36.

The action of the rocking beam 88 which pivots at the pivot point 110, creates the up and down force to move the piston 38. The rocking beam 88 is mounted on a biasing mechanism such as a spring 118 having two extension arms 120 and a cross-rod 122. The cross-rod 122 is placed into a groove 124 in the drive chamber 40 of the pump body 12. The biasing spring 118 exerts a force on the rocking beam 88 to pivot the beam at the pivot point 110 and move the output end 106 of the rocking beam in the direction of arrow 76 (FIG. 2). This draws the piston 38 in a backstroke away from the evacuation chamber 44 of the pump 10.

The end 96 of the cam rod shaft 90 extends through the slotted portion 111 of the mid-portion 109 of the rocking beam 88. The pin 112 of the rocking beam 88 is inserted through the slot 98 of the cam rod shaft 90. As the drive shaft 82 rotates, the cam rod 86 moves along a set stroke length, for example, about ⅛" or 3/16". The slot 98 in the cam rod shaft 90 moves along the pin 112, and is sized to provide sufficient freeplay for the stroke length of the cam rod 86.

As the rotation of the drive shaft 82 and cam insert 84 moves the cam rod shaft 90 in the direction of arrow 80 (FIG. 3), the end 126 of the slot 98 of the cam rod shaft 90 contacts the pin 112. This causes the rocking beam 88 to pivot at the pivot point 110, and the output end 106 of the rocking beam 88 to be drawn in the direction of arrow 80. This action slides the piston 38 within the piston chamber 36 in a forward stroke toward the evacuation chamber 44, so that the liquid is dispelled from the pump 10. The subsequent rotation of the drive shaft 82 and cam insert 84 moves the cam rod shaft in the direction of arrow 76, and the force of the biasing mechanism 118 returns the rocking beam 88 and the piston 38 in the direction of arrow 76 to the beginning of the cycle.

Figure 5:
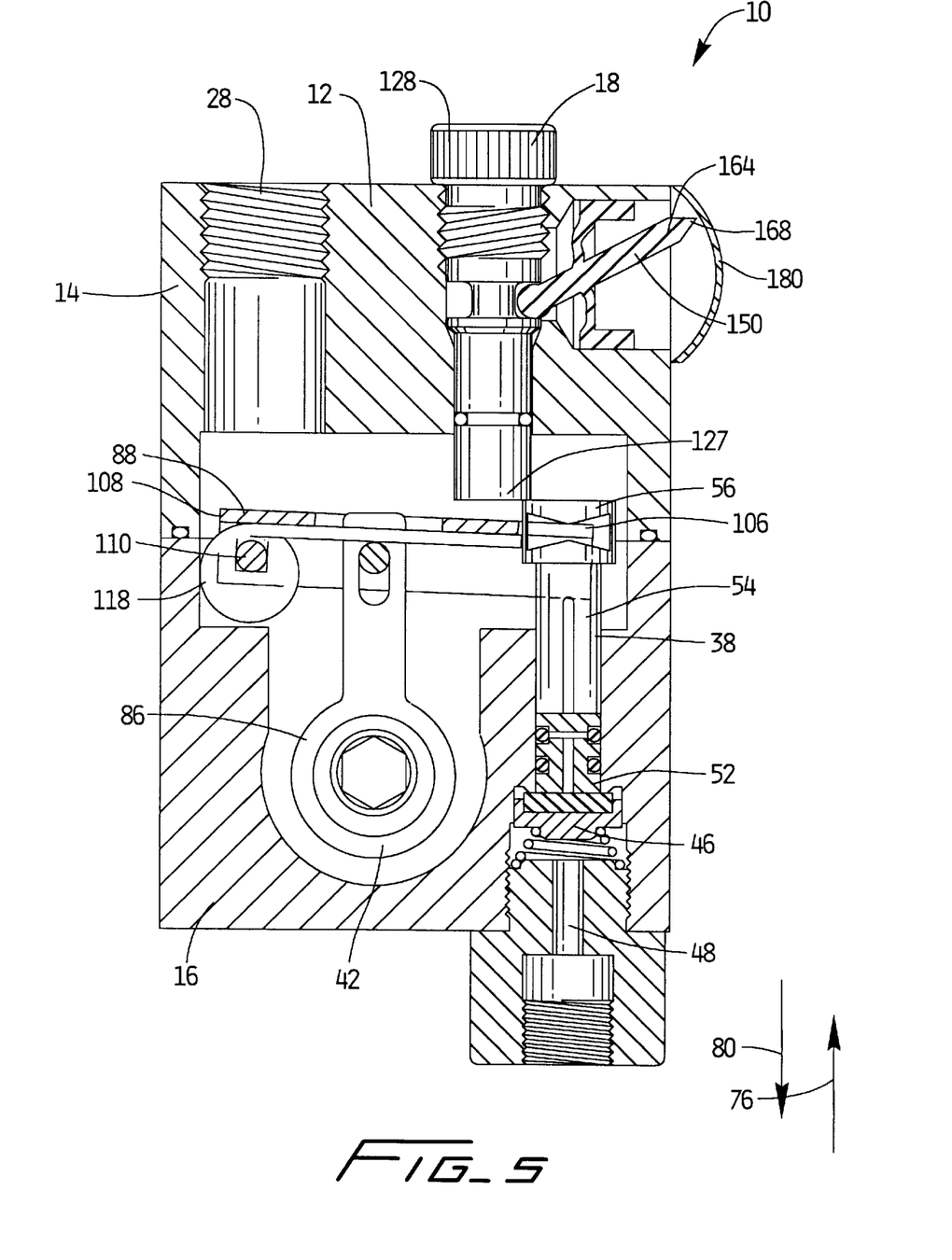
FIG. 5 is a cross-sectional view of the pump of FIG. 1 as in FIGS. 2 and 3, showing the flow adjustment stem in a second position in the pump to limit the stroke of the piston.

The flow adjustment stem 18 regulates and controls the extent of the backstroke of the piston 38 in the direction of arrow 76. This determines the amount of liquid metered from the pump 10. A first end 127 of the flow adjustment stem 18 is positioned near the second end section 56 of the piston 38. The second end 128 of the adjustment stem 18 extends out the opening 34 of the chamber 32 of the pump body 12. By turning the second end 128 of the flow adjustment stem 18 into the pump body 12, the stroke of the piston 38 is shortened. As shown in FIG. 5, the flow adjustment stem 18 is turned into the pump body 12 such that the end 52 of the piston 38 is in contact with the evacuator valve assembly 46, and the stroke of the piston 38 is thus set at zero. By turning the second end 128 out of the pump body 12, as shown in FIGS. 2 and 3, the stroke of the piston 38 is increased as is the amount of liquid that is dispensed from the pump. Thus, the flow adjustment stem 18 provides a means for adjusting the stroke of the piston 38. If it is desired that the pump 10 be calibrated to deliver a constant and fixed amount of liquid, the flow adjustment stem 18 can be set to the desired piston stroke and permanently secured in place.

The evacuation valve assembly 46 assists in the evacuation of liquid from the metering or pump chamber 78 through the liquid evacuation chamber 44, into the liquid outlet bore 48 and through a bore of an outlet fitting (not shown) that can be connected to the pump body 12 through the bore 51. The evacuation valve assembly 46 prevents air bubbles from being entrapped within the device, which design is based upon an earlier pump disclosed in U.S. Pat. No. 4,784,584, and also described in co-pending U.S. patent application Nos. 5,984,652 and 6,071,097 the disclosures of which are incorporated by reference herein. The evacuation valve assembly 46 is disposed within the liquid evacuation chamber 44 with one end 132 coupled to the outlet fitting (not shown). The other end of the evacuation valve assembly 46 includes a biasing means, such as a spring 134 and a poppet valve 136. The poppet valve 136 has a valve nut 138, such as hexagonally-shaped nut, and a plug seal 140. The plug seal 140 is biased and removably seated against the outlet 142 of the pump chamber 78 to provide a tight seal between the piston chamber 36 and the liquid evacuation chamber 44.

An outlet fitting (not shown) can be attached to the pump body 12 via the bore 51 leading to the liquid evacuation chamber 44. The outlet fitting can include an end that is adapted to be coupled to a tube (not shown) to carry the liquid to device or object or other location as desired.

Figure 6:
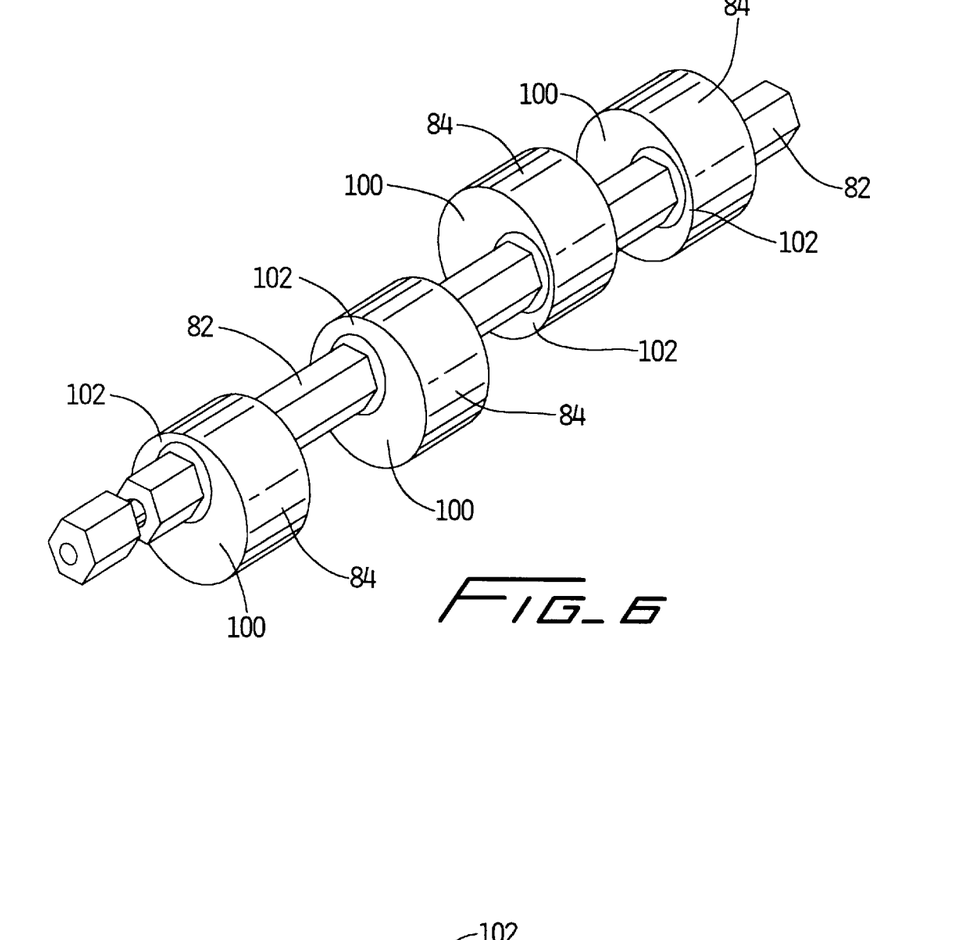
FIG. 6 is a perspective view of a drive assembly, showing the drive shaft with multiple cam inserts in a staggered arrangement.
Figure 7:
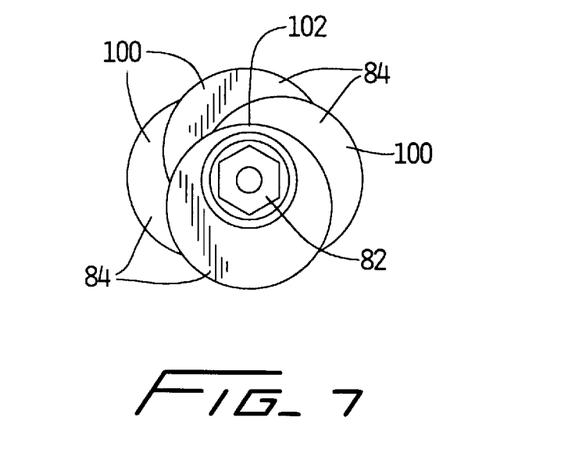
FIG. 7 is a front end view of the drive assembly of FIG. 7, along line 7—7.

FIG. 1 shows a single modular pump unit 10 that is composed of two halves 14, 16 connected together. Although not shown, single pump units can be connected together in a side-by-side arrangement to provide a multiple pump system with multiple liquid outlet feeds to a desired location. So that multiple pumps can be operated using a single drive shaft and motor, the drive shaft 82 of the drive assembly 42 can be constructed to support a plurality of eccentric cam inserts 84, as shown in FIGS. 6 and 7. In such an arrangement, the second half 16 of the pump body 12 can be cast to include a bore to accommodate the extension of the drive shaft 82 from one pump unit to an adjacent pump unit, with the bore appropriately sealed to prevent fluid leakage from the chambers of the pumps.

Referring to FIG. 6, for a multiple pump arrangement, it is preferred that the cam inserts 84 are mounted on the drive shaft 82 such that the wide portion 100 and the narrow portion 102 of adjacent cam inserts 84 are in an alternating or staggered arrangement. A cam rod (not shown) is mounted on each of the cam inserts 84, and each cam insert/cam rod combination with a rocking beam is mounted in a separate pump. Due to the arrangement of the cam inserts on the drive shaft, as the drive shaft is rotated, the downstrokes of the pistons are staggered. This staggered motion of the pistons is advantageous in a multi-pump arrangement to avoid overloading the motor and to distribute the working load evenly over one revolution.

In the embodiment of the pump 10 as shown in FIGS. 1–3 and 5, a flow volume indicator 150 is included for indicating the volume of liquid being dispensed from the pump. It is understood that the flow volume indicator 150 of the invention can be incorporated into a variety of pumps that include a member that operates to adjust the flow of liquid from the pump, such as the flow adjustment stem 18, to which the flow volume indicator 150 can be coupled. Such pumps include motor-driven pumps, and pneumatically-activated pumps as described in co-pending U.S. patent No. 5,984,652 (issued Nov. 16, 1999) and Pat. No. 6,071,097 (issued Jun. 6, 2000).

Figure 8:
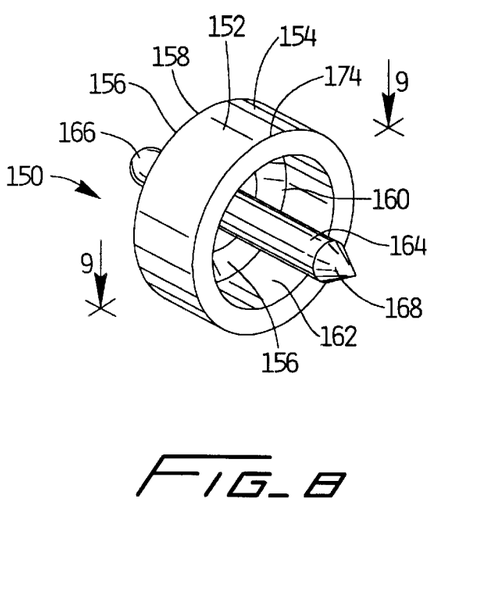
FIG. 8 is a perspective view of a flow volume indicator constructed according to the present invention.
Figure 9:
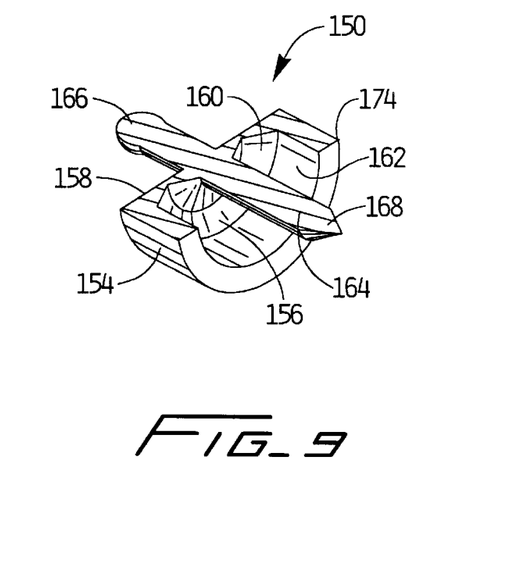
FIG. 9 is a perspective, cross-sectional view of the flow volume indicator of FIG. 8, taken along line 9—9.
Figure 10:
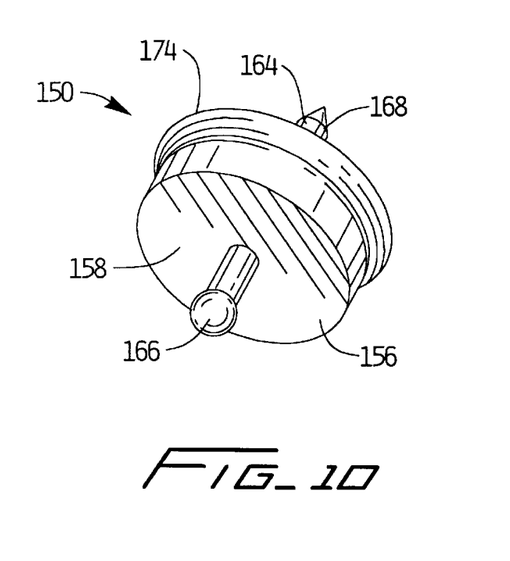
FIG. 10 is a perspective view of the flow volume indicator of FIG. 8.

As best shown in FIGS. 8–10, the flow volume indicator 150 has a main body 152 having an annular side wall 154, a flexible base wall 156 that has a first surface 158 and a second surface 160, an opening 162 opposite the base wall 156 that is defined by the annular side wall 154, and a pointer 164. The pointer 164 has a knob end 166 that protrudes from the first surface 158 of the base wall 156, and a tip end 168 that protrudes from the second surface 160 of the base wall 156.

Figure 11:
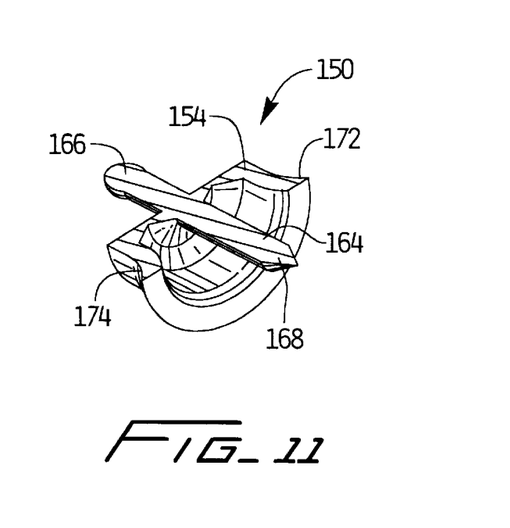
FIG. 11 is a perspective, cross-sectional view of another embodiment of a flow volume indicator according to the invention.

The pump body 12 includes a bore 170 for receiving the flow volume indicator 150 therein. The bore 170 opens into the chamber 32 that houses the flow adjustment stem 18. The flow volume indicator 150 is sized for insertion into the bore 170. The annular side wall 154 of the flow volume indicator 150 is resiliently compressible so that it can be pinched together and inserted into the bore 170 (knob end 166 first), whereupon the annular side wall 154 will re-extend or spring outward to seat the indicator 150 within the bore 170. The flow volume indicator 150 can seal the bore 170 so that liquid from the liquid chamber 66 inside the pump body 12 does not leak out the bore 170. To that end, it is preferred that the annular side wall 154 of the flow volume indicator 150 is flared in cross-sectional view, as shown in FIG. 11. As also shown, the annular side wall can include a lip extension 172 that extends continuously around the edge 174 of the indicator 150 for sealing the bore 170 of the pump body 12.

The flow volume indicator 150 is preferably made of a flexible plastic, preferably polypropylene, by injection molding, compression molding, or other suitable -process, and as a unitary structure. The base wall 156 of the flow volume indicator 150 is made of a suitably flexible plastic such that when the annular wall 154 is held firmly, the knob end 166 of the pointer 164 can be manipulated from side to side, and the base wall 156 will flex sufficiently to facilitate such movement of the pointer 164. Preferably, the base wall 156 is made of an about 0.015–0.002 inch thick polypropylene. Optionally, all or part of the flow volume indicator 150 can be colored by incorporating a colorant such as carbon black or carbon red, and the like, into the plastic material during processing, or by coating or dying the indicator after its production.

The knob end 166 of the flow volume indicator 150 is sized for insertion into a channel or groove 178 within the flow adjustment stem 18. As the flow adjustment stem 18 is moved within the chamber 32 of the pump body 12, the annular side wall 154 of the flow volume indicator 150 is maintained in a stationary position within the bore 170, and the base wall 156 flexes so that the knob end 166 of the pointer 164 moves with the flow adjustment stem 18, and the tip end 168 of the pointer 164 moves from a first position (FIGS. 2–3) to a second position (FIG. 5).

A cover 180, such as a bubble or dome top as shown in FIGS. 1–3, can be mounted on the pump body 12 over the flow volume indicator 150. The cover 180 can be attached to the pump body 12 by an adhesive material, a threaded screw, or other suitable means. The cover 180 is a clear or transparent plastic with markings 182 that correspond to the amount of liquid that is dispensed from the pump 10. As the flow adjustment stem 18 is moved within the chamber 32 of the pump body 12 to set the backstroke of the piston 38 and the amount of liquid to be dispensed from the pump 10, the pointer 164 is correspondingly moved, and the positioning of the tip end 168 at a particular marking 182 on the cover 180 indicates the volume of liquid dispensed from the pump 10. Since the pointer 164 moves through an arc while the motion of the piston is straight up and down, the distance between markings on the cover 180 are calibrated to correlate the location of the pointer 164 with the actual amount of liquid being dispensed.

As shown in FIGS. 1–3, the first half 14 of the pump body 12 includes a liquid inlet bore 28 for conducting liquid from an outside source into the liquid chamber 66 of the pump. The bore 28 can be threaded as shown. Tubing leading from a liquid source or a removable reservoir that contains a liquid can be mounted in the bore 28 (not shown). Such a pump incorporating a removable reservoir is described in co-pending U.S. patent application Ser. No. 08/876,784 (filed Jun. 16, 1997), the disclosure of which is incorporated herein. The reservoir can be pre-filled with liquid, or mounted on the pump body 12 and then filled with liquid. The fluid capacity of the reservoir can vary, and can range from about 1 ounce to about 32 ounces or more.

Figure 12:
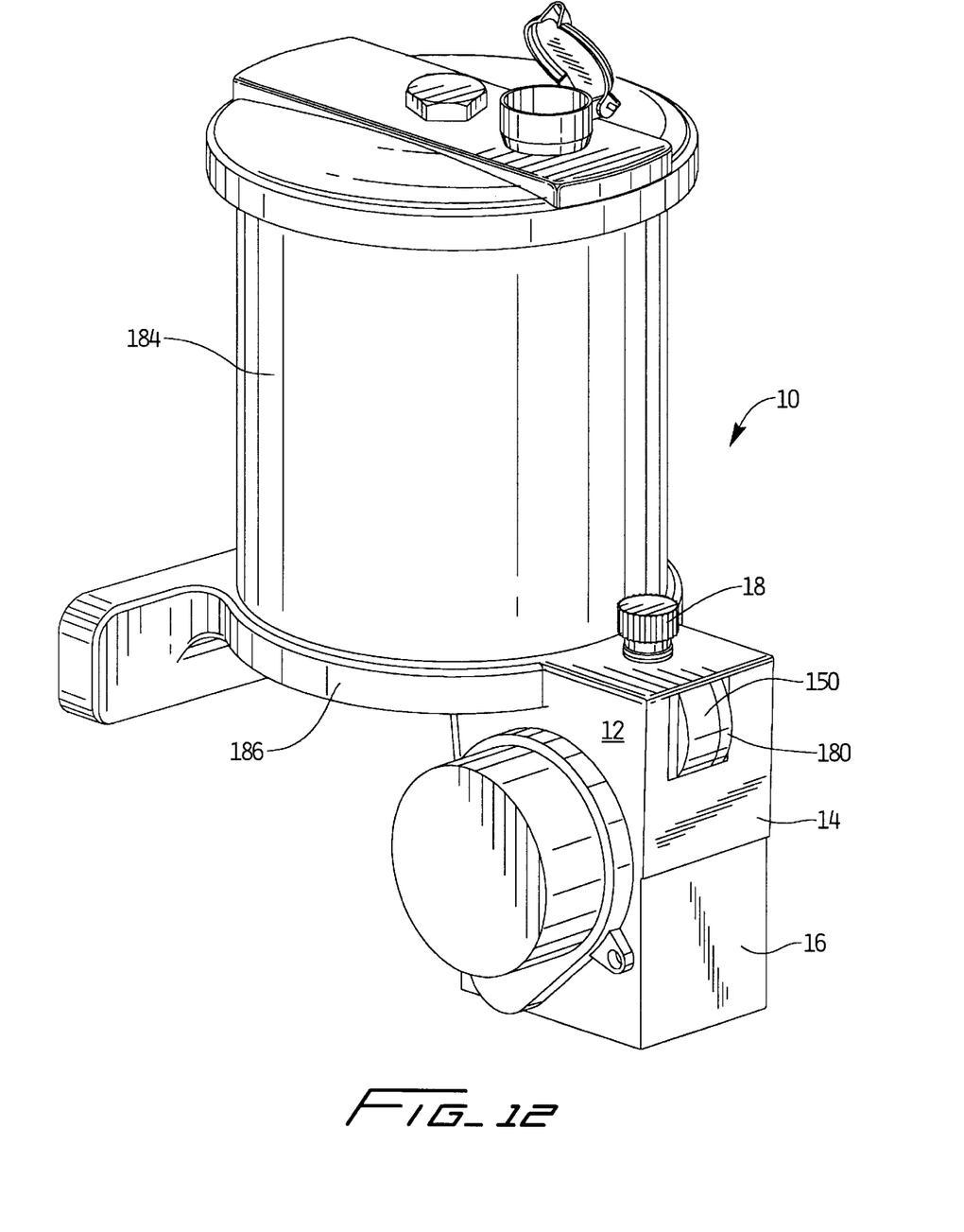
FIG. 12 is a perspective view of an embodiment of a pump according to the invention showing a reservoir for containing a liquid, mounted on a platform of the pump.

As shown in FIG. 12, the pump body 12 can be cast such that the reservoir 184 is provided as a more integral part of the pump unit. Such a pump can be achieved for example, by casting and machining the first half 14 of the pump body 12 to provide a platform 186 for mounting the reservoir 184 thereon to provide a complete unit. The resulting pump provides a more streamlined and compact unit with the reservoir 184 provided as a more built-in feature of the body 12 of the pump 10.

OPERATION

When connected to a rotary actuator (e.g., a motor), and disposed between a source of liquid and the point of delivery, the pump 10 incorporating the piston 38 and drive assembly 42 of the present invention delivers a precise amount of liquid to the desired delivery point.

The piston 38 operates in a cycle by means of the piston 38 and the drive assembly 42 to feed liquid from the liquid chamber 66 into the metering or pump chamber 78 (FIG. 2), and to dispense and pump the liquid past the poppet valve 136, through the evacuation valve assembly 46, and out the end 50 of the liquid evacuation chamber 44 and the pump 10. A reservoir containing a source of liquid, or tube leading from a liquid source (not shown) is mounted into the bore 28. Liquid flows from the liquid source into the liquid chamber 66 and into the conduit 68 in the stem section 54 of the piston 38. Depending on the position of the piston 38, liquid will also flow into the pump chamber 78. The type of liquid used depends on the application at hand. The present pump is capable of metering various liquids including, for example, synthetic and petroleum based lubricants, light grease, water, ink, cleaning fluid, gas, perfume, glue, and other flowable materials.

The pump 10 is self-priming and before it is operated for the first time, the liquid chamber 66 and the pump chamber 78 are filled with air. As seen in FIG. 2, the poppet valve 136 is biased against the opening 142 and seals the pump chamber 78 closed. The piston 38 is drawn away from the pump chamber 78 in a backstroke by the biasing force of the spring 118 in the direction of arrow 76, whereupon the pump chamber 78 becomes pressurized. The sealing member 64 in the piston 38 moves within the second, angled channel 62 such that the end 74 of the conduit 68 and the aperture are uncovered. Liquid from the reservoir or an outside source is drawn into the liquid chamber 66, into the longitudinal conduit 68 in the stem portion 54 of the piston 38, into the second, angled channel 62, into the passageway 70 and through the central bore 72, and out the end 58 of the piston 38 to the pump chamber 78.

The drive shaft 82 of the drive assembly 42 is connected to a motor (not shown) that operates to turn the drive shaft 82, for example, at a speed that can range from about 1 revolution or less per day to about 3600 rpm. As seen in FIG. 2, when the rotation of the drive shaft 82 and cam insert 84 pull the cam rod 86 and the rocking beam 88 downward in the direction of arrow 80, the slidable piston 38 is moved within the piston chamber 36 toward the poppet valve 136 (e.g., forward stroke). The force of the piston 38 against the liquid in the pump chamber 78 causes an increase in the liquid pressure against the poppet valve 136, causing the valve 136 to disengage from the opening 142 and allow liquid to flow into the liquid evacuation chamber 44. The piston 38 contacts and pushes the poppet valve 136 a predetermined distance away from the opening 142, e.g., the "kick-off" amount (not shown). This action ejects all of the measured volume of liquid and any compressed air bubbles that may have been trapped, out of the pump chamber 78 and into the liquid evacuation chamber 44.

The liquid flows around the sides of the valve nut 138, around the spring 134, into the liquid outlet bore 48, and through an outlet fitting (not shown) that is inserted into the opening 51 of end 50 of the liquid evacuation chamber 44. Simultaneously, the sealing member 64 in the piston 38 is caused to move to a position adjacent to the end 74 of the conduit 68 to block the flow of liquid into the angled channel 62 and the pump chamber 78.

At the end of the cycle, the force of the biasing spring 118 causes the rocking beam 108 to pivot about the pivot point 110 and the output end 106 to move in the direction of arrow 76. This forces the piston 38 away from the liquid evacuation chamber 44 and back to its original position, as shown in FIG. 2, while drawing liquid into the pump chamber 78. At the same time, the pump chamber 78 is closed with the plug seal 140 of the poppet valve 136 by the force applied by the spring 134, also in the direction of arrow 76, which contains the liquid within the pump chamber 78. In addition, the cam rod 86 moves in the direction of arrow 76 by the rotating driveshaft 82 and cam insert 84.

The piston cycle is repeated when the cam rod shaft 90 is then moved in the direction of arrow 80 by the rotating driveshaft 82 and cam insert 84. When the end 126 of the slot 98 contacts the pin 112 of the rocking beam 88, the beam is pulled downward and pivots about the pivot point 110 such that the output end 106 of the rocking beam 88 moves in the direction of arrow 80. This moves the piston 38 in a forward stroke toward the liquid evacuation chamber 44, as shown in FIG. 3, causing the liquid to be dispensed from the pump 10.

The amount of liquid that is fed into the pump chamber 78 with each working stroke of the piston 38 is adjusted by means of the fluid adjustment stem 18. As noted above, the fluid adjustment stem 18 is disposed in the chamber 32 with the second end 128 extending out of the body 12 of the pump 10. The stroke of the piston 38 is adjusted by turning the second end 128 into and out from the pump body 12. The adjustments are made until the tip 168 of the indicator 150 is positioned at the desired volume of liquid to be dispensed, e.g., the desired stroke length, according to the markings 182 on the cover 180.

CALIBRATION

The present invention is designed to facilitate its calibration to a zero reference so that precise metering of a liquid can be carried out. The pump should be calibrated to account for the variable kick-off amount which varies with each pump according to manufacturing tolerances. Typically, the kickoff amount ranges from about 0.003–0.013 inch depending upon the manufacturing tolerances. The stroke length of the piston 38 should also be calibrated so that the desired volume of liquid is delivered when the pump is actuated.

In calibrating the pump, the piston 38 is pushed forward in the direction of arrow 80 by turning the flow adjustment stem 18 until the first end section 52 of the piston 38 contacts the poppet valve 136 of the evacuation valve assembly 46, as shown in FIG. 5. At the point of contact with the poppet valve 136, the piston 38 is at a zero ("0") backstroke (e.g., zero output), and the tip end 168 of the pointer 164 of the flow volume indicator 150 is in a first position which is the zero set point for the volume of liquid to be dispensed from the pump. The pump is then set to a zero calibration (e.g., zero stroke) by marking the "zero" mark on the cover 180, or positioning a pre-marked cover to place the "zero" output mark at the location of the tip end 168 of the pointer 164 of the flow volume indicator 150.

If it is desired that the pump 10 dispense a predetermined and uniform amount of liquid, the piston 38 can be set to have a predetermined stroke length (e.g., a shut-off point). To do so, the flow adjustment stem 18 can be turned out of the pump, and the piston 38, by the action of the biasing spring 118, is allowed to move away from the evacuation valve assembly 46 for an appropriate distance in the direction of arrow 76 until the dial indicator reading is at the desired volume of liquid to be delivered each time the pump is actuated, e.g., the desired stroke length. This setting ensures that the piston 38 will provide an effective pumping action to deliver the desired volume of liquid from the pump chamber 78 into the liquid evacuation chamber 44. The fluid adjustment stem 18 can adjust the stroke of the piston 38 and thus the amount of liquid that is metered by it. The pump can then be tested to verify the stroke length or be put into operation.

For most applications, the pump will be calibrated to have a zero stroke. However, an additional amount may be added to the set distance so as to adjust the pump to have a predetermined minimum stroke, thus making it impossible to completely shut off liquid flow. After the zero stroke or a predetermined minimum stroke has been established, the cover 180 of the flow volume indicator 150 can be appropriately marked to indicate the amount of stroke of the piston 38, e.g., a zero stroke, a minimum stroke, or a maximum stroke, according to the positioning of the flow adjustment stem 18.

The ability to calibrate the slidable piston 38 as provided herein, permits a pump of the present invention to deliver a lubricant or other liquid in individual metered amounts from about 0.0004–0.2 ml.

The invention has been described by reference to detailed examples and methodologies. These examples are not meant to limit the scope of the invention. Variation within the concepts of the invention are apparent to those skilled in the art. The disclosures of the cited references throughout the application are incorporated by reference herein.

What is claimed is:

1. A pump, comprising:
    a body having a chamber with a piston and a drive assembly to drive the piston positioned therein;
    the piston having a longitudinal axis, a first end, a second end, and a conduit for conducting a liquid from a position on the piston to the first end; and
    the drive assembly including:
        a rotatable drive shaft;
        an eccentric cam insert positioned on the drive shaft;
        a cam rod positioned on the eccentric cam insert and having a shaft with a first end; and
        a rocking beam having an output end, an actuator end, a mid-section, and a pivot point; the output end of the rocking beam coupled to the second end of the piston, and the mid-section of the rocking beam coupled to the first end of the cam rod shaft;
    wherein when the drive shaft is rotated, the cam rod shaft is moved between a first shaft position and a second shaft position causing the rocking beam to pivot about the pivot point the output end of the rocking beam to move laterally with respect to the longitudinal axis of the piston, and the piston to move in correspondence to the rocking beam along a stroke.

2. The pump according to claim 1, wherein the drive assembly further includes a biasing mechanism coupled to the rocking beam to bias the rocking beam toward the first beam position.

3. The pump according to claim 1, further comprising:
    a flow adjustment stem having a first end and a second end; the first end extending out of the pump body, and the second end positioned near the second end of the piston;
    the position of the flow adjustment stem in the pump being adjustable to modify the stroke of the piston.

4. The pump according to claim 1, wherein the first end of the rocking beam includes two prong extensions that straddle opposite sides of the second end of the piston.

5. The pump according to claim 4, wherein the second end of the piston includes opposing grooves for receiving the prong extensions of the rocking beam therein.

6. The pump according to claim 5, wherein the mid-section of the rocking beam includes a pin, and the shaft of the cam rod includes a slot for receiving the pin therethrough, wherein the contact of the pin with the slot upon the movement of the cam rod shaft to the second shaft position causes the walking beam to pivot and move to the second beam position.

7. The pump according to claim 3, further comprising:
    a flow volume indicator coupled and moveable with the flow adjustment stem to indicate the amount of liquid dispensed from the pump.

8. The pump according to claim 7, wherein the flow volume indicator comprises a main body with a pointer having a tip end and a knob end, the knob end being coupled with the flow adjustment stem.

9. The pump according to claim 8, wherein the main body of the flow volume indicator has an annular side wall, a flexible base wall with a first surface and a second surface, an opening opposite the base wall and defined by the annular wall, and the knob end of the pointer protrudes from the first surface of the base wall and the tip end protrudes from the second surface of the base wall;
the flow volume indicator being inserted into a bore in the body of the pump with the knob end coupled with the flow adjustment stem;
wherein when the flow adjustment stem is moved within the body of the pump, the annular side wall of the flow volume indicator is held stationary within the bore, the knob end of the pointer moves with the flow adjustment stem from a first position to a second position, and the base wall of the flow volume indicator flexes.

10. The pump according to claim 9, wherein the annular side wall of the flow volume indicator is flared in cross-sectional view.

11. The pump according to claim 9, wherein the annular side wall of the flow volume indicator comprises a lip extension extending continuously around the annular side wall.

12. The pump according to claim 1, wherein the pump further comprises a reservoir releasably mounted therein.

13. A pump, comprising:
a body having a central chamber with a metering chamber having an opening, a piston disposed within the metering chamber, and a moveable valve assembly for blocking the opening of the metering chamber to maintain a liquid therein; the piston having a first end, a second end, a member for receiving and conducting a liquid along a length of the piston and out of the first end, and means for alternately opening and closing the liquid receiving/conducting member to prevent liquid flow therethrough;
wherein movement of the piston within the chamber of the pump along a stroke in a direction away from the valve assembly causes liquid to flow through the liquid receiving/conducting member to the metering chamber; and movement of the piston along a stroke in a direction toward the valve assembly causes the valve assembly to disengage from the opening and the liquid in the metering chamber to be dispelled therefrom, the force of the piston against the valve assembly causing the liquid and compressed air bubbles in the metering chamber to be dispelled out of the metering chamber.

14. A flow volume indicator for use in a pump to indicate the volume of liquid being dispensed therefrom, the pump including a member for adjusting the flow of liquid dispensed from the pump, the flow volume indicator comprising:
a main body with a pointer having a tip end and a knob end, the knob end being adapted for being coupled with the flow adjustment member.

15. The flow volume indicator according to claim 14, wherein the main body has an annular side wall, a flexible base wall with a first surface and a second surface, and an opening opposite the base wall and defined by the annular wall; and the knob end of the pointer protrudes from the first surface of the base wall, and a tip end protrudes from the second surface of the base wall;
wherein when the annular side wall of the main body of the flow volume indicator is held stationary and the knob end of the pointer is moved from a first position to a second position, the base wall flexes.

16. The flow volume indicator according to claim 14, wherein the annular side wall is flared in cross-sectional view.

17. The flow volume indicator according to claim 14, further comprising a lip extension extending continuously around the annular side wall.

18. The flow volume indicator according to claim 14, wherein the pump comprises a body having a chamber and a bore, and the flow volume indicator is sized for insertion into and sealing the bore of the pump body;
wherein when the flow volume indicator is inserted into the bore of the pump body and the knob end is coupled with the flow adjustment member disposed within the chamber of the pump body, and the flow adjustment member is moved from a first position to a second position, the annular wall of the flow volume indicator is maintained in stationary position within the bore, the knob end of the pointer moves with the flow adjustment member, and the base wall of the flow volume indicator flexes.

19. A drive assembly for use in a pump having a body with a chamber and a piston having a longitudinal axis positioned therein, the drive assembly comprising:
a rotatable drive shaft;
an eccentric cam insert positioned on the drive shaft;
a cam rod positioned on the eccentric cam insert and having a shaft with a first end; and
a rocking beam having an output end, an actuator end, a mid-section, and a pivot point; the output end coupled to an end of the piston, and the mid-section coupled to the first end of the cam rod shaft;
wherein when the drive shaft is rotated, the cam rod shaft is moved between a first position and a second position causing the rocking beam to pivot about the pivot point, the output end of the rocking beam to move laterally with respect to the longitudinal axis of the piston, and the piston to move in correspondence to the rocking beam along a stroke.

20. The drive assembly according to claim 19, further comprising a biasing mechanism coupled to the rocking beam to bias the rocking beam toward the first beam position.

21. The drive assembly according to claim 19, wherein the mid-section of the rocking beam includes a pin, and the shaft of the cam rod includes a slot for receiving the pin therethrough, wherein the contact of the pin with the slot upon the movement of the cam rod shaft to the second shaft position causes the walking beam to pivot and move to the second beam position.

22. A pump, comprising:
a body having a chamber in liquid communication with an inlet and an outlet, the chamber having a piston and a drive assembly to drive the piston positioned therein;
the piston with a conduit for conducting a liquid from the chamber to the outlet;
the drive assembly including:
a rotatable drive shaft with an eccentric cam positioned thereon;
a cam rod connected at one end to the eccentric cam insert, and having a slot therein;
a rocking beam having an actuator end connected to a cross rod that serves as a pivot point, a mid portion having a slotted portion therein for connecting to the cam rod, and an output end coupled to the piston; and
a pin positioned in the cam rod slot that serves to connect the rocking beam to the cam rod;
wherein when the drive shaft is rotated, the cam rod moves in a direction parallel to a longitudinal axis of the piston, causing the rocking beam to pivot about the pivot point, the output end of the rocking beam to move in a transverse and parallel direction with respect to the longitudinal axis of the piston, and the piston to move axially.

23. The pump according to claim 22, wherein the drive assembly further includes a biasing mechanism coupled to the rocking beam to bias the rocking beam in a direction that is away from the drive shaft.

24. The pump according to claim 22, further comprising:
- a flow adjustment stem having a first end extending out of the pump body, and a second end positioned near the piston;
- the position of the flow adjustment stem in the pump being adjustable to modify the axial movement of the piston.

25. The pump according to claim 22, wherein the first end of the rocking beam includes two prong extensions that straddle opposite sides of the piston.

26. The pump according to claim 25, wherein the piston includes opposing grooves for coupling with the prong extensions.

27. The pump according to claim 24, further comprising:
- a flow volume indicator coupled to and moveable with the flow adjustment stem to indicate the amount of liquid dispensed from the pump.

28. The pump according to claim 27, wherein the flow volume indicator comprises a main body with a pointer having a tip end and a knob end, the knob end being coupled with the flow adjustment stem.

29. The pump according to claim 28, wherein the main body of the flow volume indicator has an annular side wall, a flexible base wall with a first surface and a second surface, an opening opposite the base wall and defined by the annular wall, and the knob end of the pointer protrudes from the first surface of the base wall and the tip end protrudes from the second surface of the base wall;
- the flow volume indicator being connected to the body of the pump;
- wherein when the flow adjustment stem is moved within the body of the pump, the annular side wall of the flow volume indicator is held stationary within the bore, the knob end of the pointer moves with the flow adjustment stem, and the base wall of the flow volume indicator flexes.

* * * * *